US012701396B2

(12) United States Patent
Sabeur et al.

(10) Patent No.: US 12,701,396 B2
(45) Date of Patent: Aug. 4, 2026

(54) SYSTEMS AND METHODS FOR ROUTING SMS MESSAGES IN A VISITED NETWORK USING A PROXY

(71) Applicant: T-Mobile USA, Inc., Bellevue, WA (US)

(72) Inventors: Nassereddine Sabeur, Bellevue, WA (US); Joel Arends, Renton, WA (US); Marc A. Proctor, Shanwee, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 272 days.

(21) Appl. No.: 18/484,164

(22) Filed: Oct. 10, 2023

(65) Prior Publication Data

US 2025/0119724 A1 Apr. 10, 2025

(51) Int. Cl.
*H04W 8/04* (2009.01)
*H04W 40/20* (2009.01)
*H04W 84/04* (2009.01)

(52) U.S. Cl.
CPC ............. *H04W 8/04* (2013.01); *H04W 40/20* (2013.01); *H04W 84/042* (2013.01)

(58) Field of Classification Search
CPC ..... H04W 8/04; H04W 40/20; H04W 84/042; H04W 8/12
See application file for complete search history.

(56) References Cited

U.S. PATENT DOCUMENTS

| | | | | |
|---|---|---|---|---|
| 11,606,728 B1 * | 3/2023 | Yau | ........................ | H04W 76/16 |
| 2013/0171974 A1 * | 7/2013 | Bae | ........................ | H04W 8/12 |
| | | | | 455/411 |

| | | | | |
|---|---|---|---|---|
| 2015/0011210 A1 * | 1/2015 | Drevon | ............... | H04W 60/005 |
| | | | | 455/435.2 |
| 2016/0057607 A1 * | 2/2016 | Dubesset | ................ | H04W 8/04 |
| | | | | 455/433 |
| 2017/0238121 A1 * | 8/2017 | Thiebaut | ............... | H04W 76/19 |
| | | | | 455/414.1 |
| 2020/0021953 A1 * | 1/2020 | Mahalank | ............... | H04W 4/14 |
| 2020/0053556 A1 * | 2/2020 | Mukherjee | .............. | H04W 8/30 |
| 2021/0227001 A1 * | 7/2021 | Yau | ........................ | H04L 65/104 |
| 2021/0368305 A1 * | 11/2021 | Kodaypak | ............... | H04W 4/14 |

FOREIGN PATENT DOCUMENTS

| | | | | | |
|---|---|---|---|---|---|
| EP | 2789131 B1 * | 5/2021 | ............. | H04W 4/14 |
| EP | 4007316 A1 * | 6/2022 | ............. | H04W 8/02 |

* cited by examiner

*Primary Examiner* — Nizar N Sivji

(74) *Attorney, Agent, or Firm* — Lee & Hayes, P.C.

(57) ABSTRACT

System and methods for using a visitor subscriber service (VSS) to provide short messaging services (SMS) on an advanced network for inbound roamers are described. The VSS acts as proxy for registration services and uses profile information of a roaming UE to either route a mobile terminated SMS message for the UE to an IMS if the UE supports SMS over IMS, or, to a mobile call operator (MCO) using SMS over SGS if the UE does not support SMS over IMS. The VSS interfaces with a home location register (HLR) of a HPLMN of the UE to provide a visitor location register (VLR) address of the VSS. The VLR address is used by an SMSC of the HPLMN to route the SMS message to the VSS. The MCO interfaces with a mobility management entity (MME) to which the UE attaches during a registration operation.

17 Claims, 6 Drawing Sheets

SYSTEMS AND METHODS FOR ROUTING SMS MESSAGES IN A VISITED NETWORK USING A PROXY

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. However, some of these systems are being removed from service. As legacy wireless mobile telecommunications networks such as second generation (2G) and third generation (3G) networks are removed from service, services provided to user equipment or devices that were designed for those networks may need to be continued in later generation networks. These services may also need to be provided by networks to which the inbound roamers may visit. An example of services that may need to be continued at visited networks include short messaging services.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
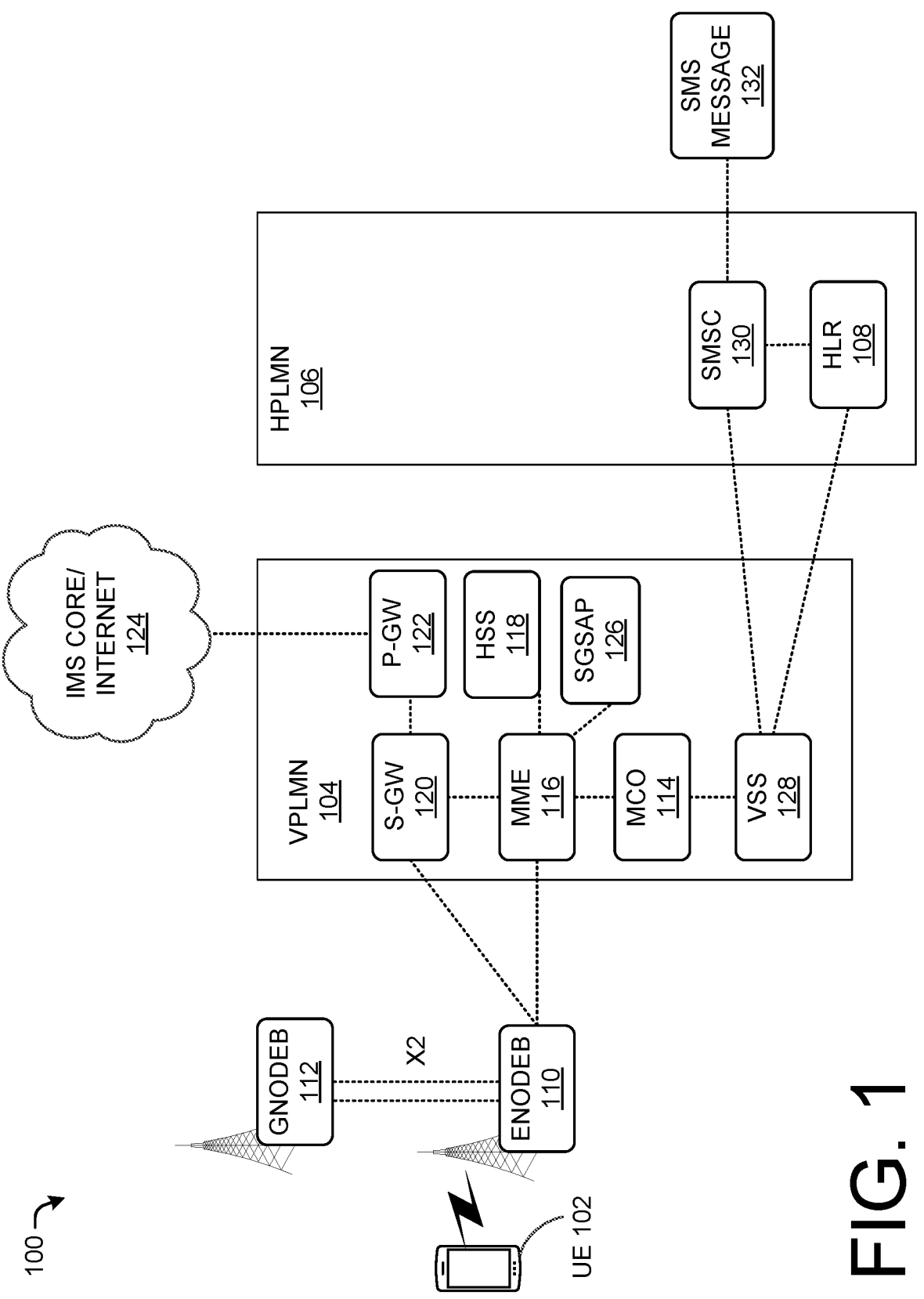
FIG. 1 is a schematic diagram of an illustrative wireless communication network environment in which systems and techniques for providing short messaging services, in accordance with examples of the disclosure.

This disclosure is directed in part to systems and technologies for using a visitor subscriber service to provide short messaging services (SMS) on an advanced network for inbound roamers using user equipment (UE) (e.g., smartphone, cell phone, mobile device, wireless communication device, mobile station, etc.) registered on a 2G or 3G home network. Such advanced networks include networks that support one or more 3GPP standards, including, but not limited to, Long Term Evolution (LTE) networks (e.g., 4G LTE networks) and New Radio (NR) networks (e.g., 5G NR networks). However, the disclosed systems and techniques may be applicable in any network or system in which a user device may request and receive access to communicate with network and/or remote devices using any protocol.

To handle when an SMS message is received into a network for a roaming device that was registered on a 2G/3G network, the visited network uses a visitor subscriber server (VSS) to act as a proxy for registration and registration verification. In some examples, a mobile switching center (MSC) of a 2G/3G network would have a direct communication link to the home location register (HLR) for other carriers. Thus, the MSC would be able to determine the registration status of a visiting UE by accessing the HLR of the home network for the UE. With the decommissioning of 2G/3G networks, an MSC is not available for use to determine a registration status of the UE. As used herein, "registration status" means the UE is registered on the home network and which SMS protocol is used. For example, the UE may be registered and supports SMS over IP, whereby the SMS message is transferred using the IP multimedia subsystem (IMS) core of a network. In another example, the UE may be registered and supports SMS over service gateways (SGS). SMS over SGS is a protocol that provides for the transfer of an SMS using a mobile management entity (MME) and carried in non-access stratum (NAS) signaling to the UE. The SMS over SGS is increasingly used because of the decommissioning of 2G/3G networks, which would otherwise provide the messaging service to UEs that are registered and do not support SMS over IP. In still further examples, the UE may not be registered, or the capability of the UE may not be known.

To process a mobile terminating (MT) SMS message for a UE in a visited network, the VSS determines the registration status of the UE. In some examples, when a UE attaches to the visited network, the VSS retrieves the registration status of the UE from the home location register (HLR) of the home network of the UE. If the UE is registered for SMS over IP, when a visited network receives an MT message for the UE, the visited network can process the MT message over the voice over long term evolution (VoLTE) through the IMS core. If the UE is registered but not for SMS over IP, the visited network processes the MT message using SMS over SGS using information provided by a mobile call operator (MCO) to which the UE attached. Thus, the VSS is acting as a proxy for an MSC of the 2G/3G networks.

Illustrative System Architecture

In FIG. 1, illustrates a wireless network environment 100 for routing an SMS message, in accordance with examples of the disclosure. In FIG. 1, a user equipment (UE) 102 is attached to a network operator (not shown) that owns or controls visited public land mobile network (VPLMN) 104. In some examples, the VPLMN 104 may be considered a "visited mobile telecommunications network" of the user equipment 102. The VPLMN 104 is a public land mobile network upon which the mobile subscriber of the UE 102 has roamed when leaving a home public land mobile network (HPLMN) 106. In various examples, the HPLMN 106 may be considered the "home mobile telecommunications network" of the user equipment 102. To maintain a database of the subscribers to the HPLMN 106, the HPLMN 106 has stored therein home location register (HLR) 108. The Home Location Register (HLR) is a database of permanent or semi-permanent subscriber information for a mobile network. It should be noted that for the purposes of describing the various examples of the presently disclosed subject matter, some functions and/or components of the VPLMN 104 and the HPLMN 106 are not illustrated.

Maintained by the subscriber's home carrier (or the network operator where the user initiated the call), the HLR includes pertinent user information, including address, account status, and preferences. For example, the HLR 108 may include information such as the registration status and whether or not the UE 102 is registered for SMS over IP or SMS over SGS. In some examples, the HLR 108 may be a function of, or replaced by, a home subscriber server (HSS). In some systems, a home subscriber server (HSS) is used in IMS, 4G, and 4G-LTE applications, whereas the HLR 108 is used in 2G and 3G applications. It should be understood that the presently disclosed subject matter is not limited to any particular network type, network evolution, or network standard.

To use the VPLMN 104, the UE 102 first attaches to the VPLMN 104 by wirelessly communicating with an eNodeB 110, which is a base station of the VPLMN 104. In the example illustrated in FIG. 1, the eNodeB 110 is the base station used for 4G LTE communications, whereas a gNodeB 112 is the base station used for 5G new radio (NR) communications. The UE 102 requests wireless communications services (attaches) to the VPLMN 104 using a mobile call operator (MCO) 114. The MCO 114 provides services similar to a mobile switching center (MSC) or mobile switching server (MSS) that would be provided in a 2G/3G network. When attaching to the VPLMN 104, the UE 102 communicates with a mobility management entity (MME) 116. In some examples, the MME 116 maintains a record of the UEs that are registered on the VPLMN 104 (including UEs to which the VPLMN is an HPLMN). The MME 116 controls setting up and tearing down data sessions and authenticates and authorizes users on the VPLMN 104.

For UEs to which the VPLMN 104 is their HPLMN (meaning the network is the home network for the UE), the MME 116 communicates and accesses a home subscriber server (HSS) 118. The HSS 118 is a master user database that supports network entities that handle calls/sessions. The HSS 118 contains user profiles, performs authentication and authorization of the user, and can provide information about the physical location of user. The VPLMN 104 further includes serving gateway (S-GW) 120. The S-GW 120 is a user-plane node that acts as a mobility anchor when a user equipment moves between various eNodeBs. A packet gateway (P-GW) 122 connects the VPLMN 104 to an IMS core and Internet (IMS) 124. The IMS 124 is used to deliver IP multimedia services. For example, if the UE 102 is registered and supports SMS over IP, the IMS 124 will be used to deliver the SMS message. As noted above, if the UE 102 is registered but does not support SMS over IP, or is not registered, the SMS message will be delivered using SMS over SGS. An SGS application part (SGSAP) 126 is used by the MME 116 to transmit messages to the UE 102 when the UE 102 does not support SMS over IP through the IMS 124. When an SMS message is received for a UE 102 that does not support SMS over IP, the SMS message is transferred using the SGSAP 126 of the MME 116 and carried in NAS signaling to the UE 102, thus avoiding the need to execute fallback to a 2G/3G network.

When the UE 102 first attaches to the MME 116 of the VPLMN 104, the UE 102 perform an attach procedure such as a combined attach. As noted above, the MCO 114 is a proxy for an MSS/MSC of a legacy network such as a 2G or 3G network. To store information about subscribers roaming within the VPLMN 104, a visitor subscriber server (VSS) 128 is provided. The VSS 128 provides registration and registration verification services to the VPLMN 104 by communicating with the HLR 108. Further, the VSS 128 communicates with the MCO 114 to provide the communication protocol (i.e., SMS over IP or SMS over SGS) to use for inbound SMS messages that MT at the UE 102. Further the VSS 128 further provide visitor location register (VLR)

services for the UE 102. The VSS 128 is the database that contains information about subscribers roaming within the VPLMN 104, which is the VLR service. When the UE 102 attaches to the VPLMN 104, a VLR address of the VSS 128 is provided to the HLR 108. The HLR 108 marks the VLR address of the VSS 128 in the profile stored in the HLR 108. The HLR 108 further downloads the profile of the UE 102 to the VSS 128. In some examples, the profile includes the phone number to which the UE 102 is contacted by an MT SMS intended for the UE 102. Once the UE 102 is attached, the VSS 128 has determined which SMS communication protocol (i.e., SMS over IP or SMS over SGS) to use for inbound SMS messages that MT at the UE 102 and the MME 116 to which the UE 102 is serviced.

When an SMS message 132 is received at a short message service center (SMSC) 130 of the HPLMN 106, the SMSC 130 needs to know where to send the SMS message 132. The SMSC 130 contacts the HLR 108 to retrieve information about where to send the SMS message 132. As noted above, when the UE 102 attaches to the VPLMN 104, a VLR address of the VSS 128 is provided to the HLR 108. The HLR 108 marks the VLR address of the VSS 128 in the profile stored in the HLR 108. The HLR 108 provides the profile to the SMSC 130. If the VSS 128 determines that the UE 102 is IMS registered for SMS over IP services, the SMSC 130 uses the IMS 124. If the VSS 128 determines that the UE 102 is not registered, the registration is unknown, or is not registered for SMS over IP, the SMSC 130 transmits the SMS message 132 to the MCO 114 to which the UE 102 is attached. The MCO 114 transmits the SMS message 132 to the MME 116, Using the SGSAP 126, which in turn transmits the SMS message 132 to the UE 102 using the eNodeB 110.

Illustrative Signal Flows

Figure 2:
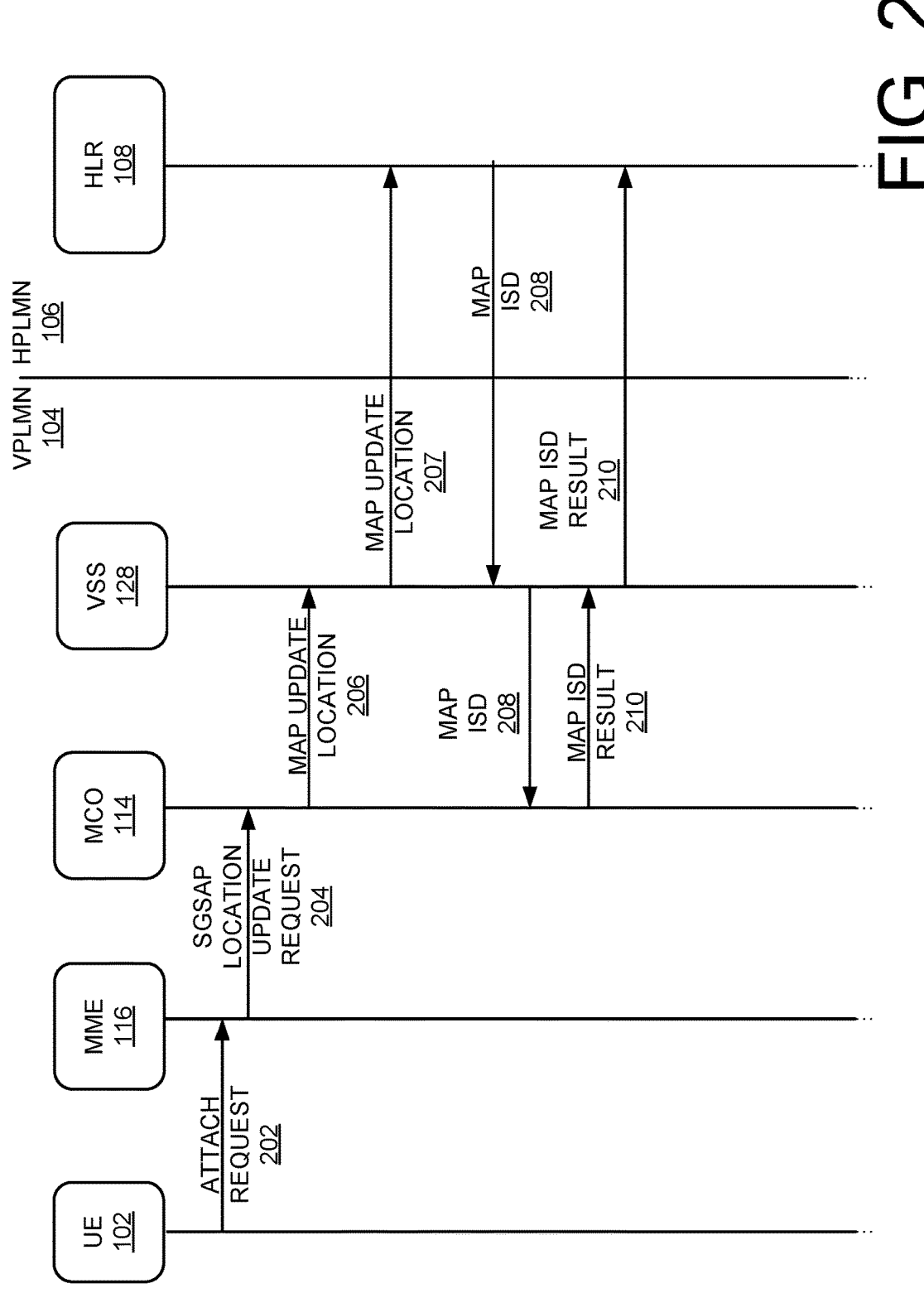
FIG. 2 is a diagram of an illustrative signal flow associated with a registration process for providing short messaging services, in accordance with examples of the disclosure.

FIG. 2 illustrates an exemplary signal flow of a registration process 200 for using a visitor subscriber service to provide short messaging services (SMS) on an advanced network for inbound roamers using user equipment (UE) registered on a 2G/3G network, in accordance with examples of the disclosure. Reference may be made in this description of the registration process 200 to devices, entities, and interfaces illustrated in FIG. 1 and described in regard to that figure. However, the operations, signals, and signal flow illustrated in FIG. 2 and described herein may be implemented in any suitable system and/or with any one or more suitable devices and/or entities. Moreover, any of the operations, signals, and/or entities described in regard to FIG. 2 may be used separately and/or in conjunction with other operations, signals, and/or entities. All such embodiments are contemplated as within the scope of the instant disclosure.

To begin the process of registering the UE 102, the UE 102 transmits an attach request 202 message to the MME 116. In some examples, the attach request 202 is a combined attached request that includes an SGS location update (SGSAP) 204 delivered to the MCO 114. In the presently disclosed subject matter, the MCO 114 is acting as an MSS.

The registration process 200 is continued by the MCO 114 transmitting a map update location 206 to the VSS 128. In various examples of the presently disclosed subject matter, the map update location uses an identifier of the UE 102, such as the international mobile subscriber identity (IMSI), although other identifiers may be used and are considered to be within the scope of the presently disclosed subject matter.

The VSS 128 receives the map update location 206 from the MCO 114 and begins to build a VSS profile for the UE 102 if a profile is not present and store the "attach check"

(SG) indication. If a VSS profile is present, the VSS 128 may update the current VSS profile. For example, if a VSS profile is present, the VSS 128 may be informed that the "attach check" (SGS/IMS/both) capability is already present. If the current profile indicates that the UE 102 supports SMS over IMS, the profile is updated to "both," meaning that the UE 102 can receive MT SMS messages using either communication protocol. Additionally, the VSS 128 updates the VLR address used for the UE 102 in the profile.

The VSS 128 then transmits an updated map update location 207 to the HLR 108. In some examples, the updated map update location 207 includes the VLR address of the VSS 128.

The HLR 108 receives the map update location 207 from the VSS 128 and marks the information in the HLR profile stored in the HLR 108 for the UE 102. In this manner, if an MT SMS message is received at the HPLMN 106 for the UE 102, the HLR 108 knows where to direct the MT SMS message. The location to which MT SMS messages are to be directed is used by the SMSC 130 of the HPLMN 106.

The HLR 108 downloads the profile of the UE 102 to the VSS 128 by transmitting a MAP ISD 208. The profile can include various information such as the public number of the UE 102. The MAP ISD 208 is provided to the MCO 114, thereby registering the UE 102 onto the VPLMN 104. The MCO transmits a map ISD result 210 to the VSS 128, and onto the HLR 108 to update the HLR 108 that the MAP ISD 208 has been received.

Figure 3:
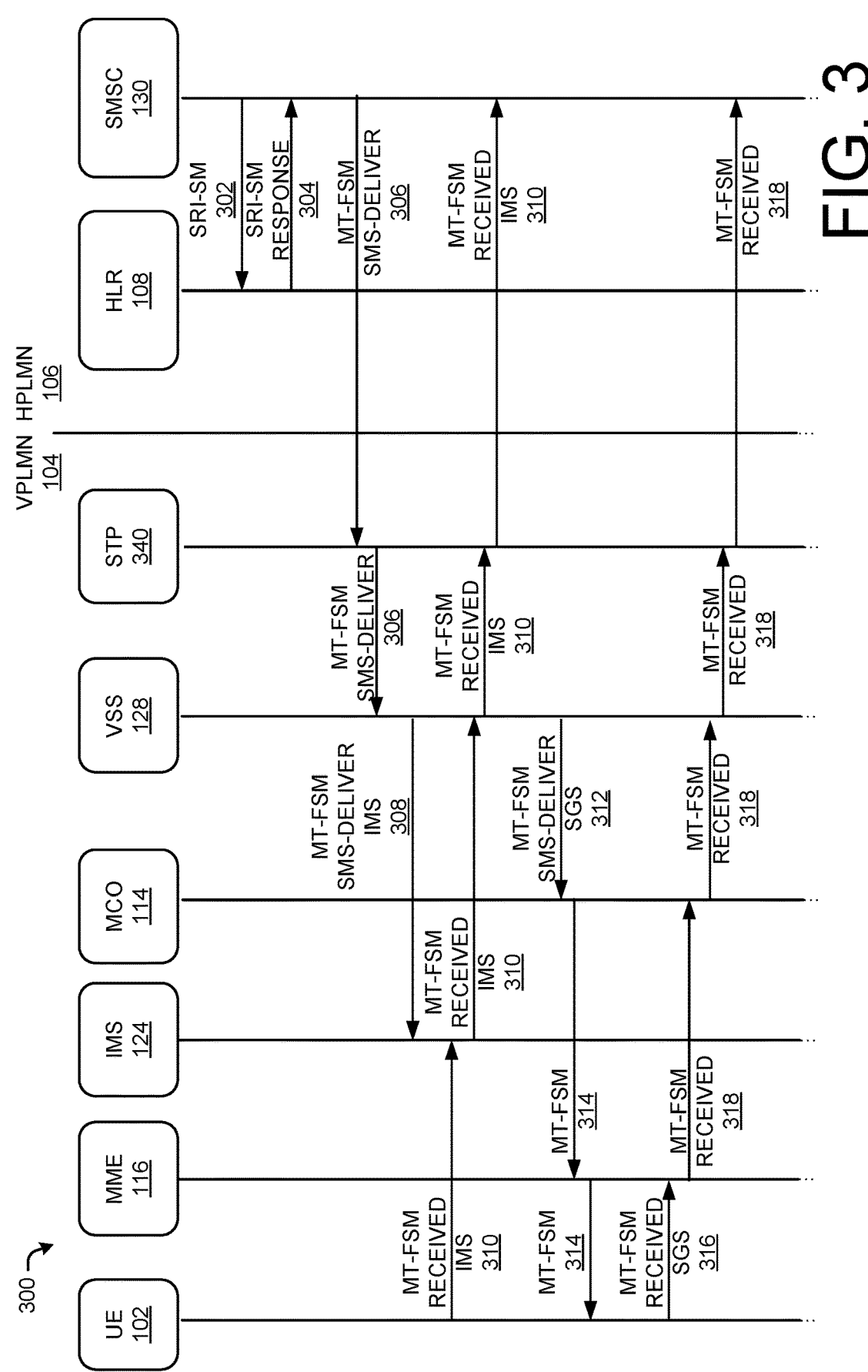
FIG. 3 is a diagram of an illustrative signal flow associated with a routing process for providing short messaging services, in accordance with examples of the disclosure.

FIG. 3 illustrates an exemplary signal flow of the routing process 300 for routing the SMS message 132 received at the HPLMN 106 intended for the UE 102. As noted above, when the SMS message 132 is received at the SMSC 130 of the HPLMN 106, the SMSC 130 needs to know where to route the SMS message 132 to. During the registration process, the VSS 128 of the VPLMN 104 provided the VLR address of the VSS 128 to the HLR 108.

When the SMS message 132 is received at the SMSC 130, the SMSC 130 transmits a short routing information for short message (SRI-SM) 302 to the HLR 108. The HLR 108, in an SRI-SM response 304, returns the VLR address of the VSS 128.

Once the SMSC 130 knows where to deliver the SMS message 132, the SMSC 130 transmits an SMS-Deliver message 306 to a signal transfer point (STP) 340 and addresses the message to the VLR address of the VSS 128. The STP 340 is a node in a network that routes signaling messages based on their destination point code in the network.

Once the VSS 128 receives the SMS-Deliver message 306 from the STP 340, the VSS 128 commences the checking process to determine the manner in which the SMS message 132 will be transmitted to the UE 102, i.e., SMS over IP or SMS over SGS. The VSS 128 checks to see first if the subscriber of the UE 102 is attached to the VPLMN 104.

The VSS 128 then determines if the UE 102 supports SMS over IP. If the VSS 128 determines that the UE 102 supports SMS over IP, the SMS message 132 is transmitted to the UE 102 using the IMS 124 (indicated by the MT-FSM Deliver 308; IMS message in FIG. 3). Once received through the IMS 124, the UE 102 transmits an MT-FSM received IMS message to the IMS 124. The MT-FSM received IMS 310 message is routed to the SMSC 130 through the VPLMN 104.

If the VSS 128 determines that the UE 102 does not support SMS over IP, the VSS 128 defaults to SMS over SGS. The VSS 128 knows the MCO 114 to which the UE 102 is attached from the update location message provided during the registration process of the UE 102. The VSS 128 transmits the SMS message 132 to the MCO 114 (indicated by the MT-FSM Deliver 312; SGS message in FIG. 3). The MCO 114 routes the SMS message 132 to the UE 102 through the MME 116. Once received, the UE 102 transmits an MT-FSM received SGS 316 to the MME 116. A MT-FSM received SGS 318 is routed to the SMSC 130 through the VPLMN 104.

Illustrative Operations

Figure 4:
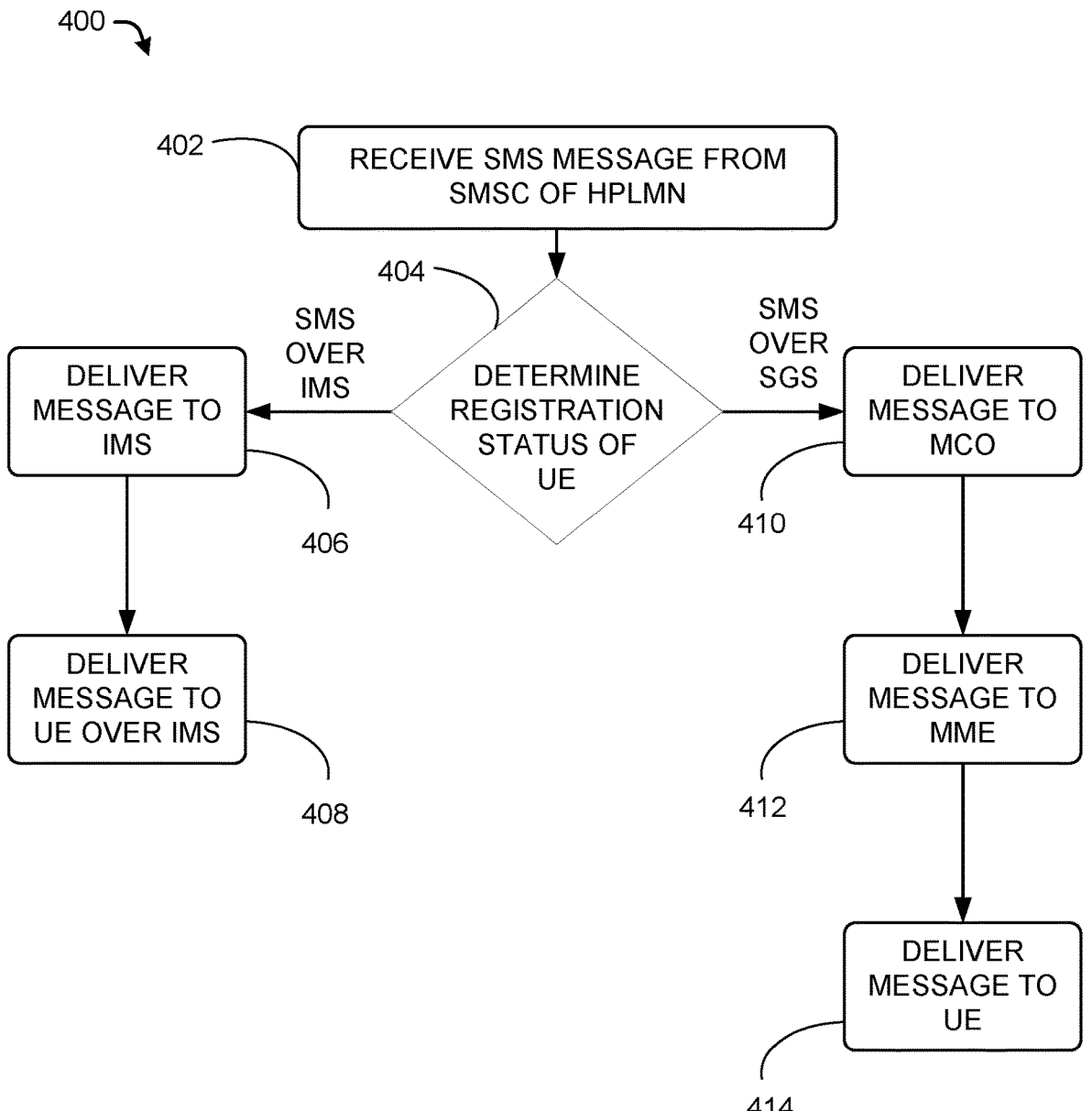
FIG. 4 is a flow diagram of an illustrative process for routing an SMS message, in accordance with examples of the disclosure.

FIG. 4 shows a flow diagram of an illustrative process 400 for routing the SMS message 132 received at the HPLMN 106 intended for the UE 102, according to the disclosed embodiments. The process 400 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 400 may be described with reference to the wireless network environment 100 of FIG. 1, however other environments may also be used.

At block 402, the VSS 128 receives the SMS message 132 from the SMSC 130 of the HPLMN 106. As noted above with respect to FIGS. 2 and 3, when the UE 102 registers with the VPLMN 104, the VLR address of the VSS 128 is provided to the HLR 108. The SMSC 130 of the HPLMN 106 uses the VLR address of the VSS 128 to determine where in the VPLMN 104 to send the SMS message 132.

At block 404, the VSS 128 determines if the UE 102 supports SMS over IP or SMS over SGS. As explained in FIG. 3, when the UE 102 registers with the VPLMN 104, part of the registration process includes profile information of the UE 102. The profile information includes the SMS protocols the UE 102 supports (or is registered/subscribed for).

If at block 404 the VSS 128 determines that the UE 102 supports SMS over IMS, at block 406 the VSS 128 routes the SMS message 132 to the IMS 124 of the VPLMN 104. At block 408, the SMS message 132 is thereafter routed to the UE 102 over the IMS 124.

If at block 404 the VSS 128 determines that the UE 102 does not support SMS over IMS, the VSS 128 defaults to the use of SMS over SGS for delivering the SMS message 132. At block 410, the SMS message 132 is delivered to the MCO 114 to which the UE 102 is attached. At block 412 the SMS message 132 is delivered to the MME 116, and thereafter, at block 414, the SMS message 132 is delivered to the UE 102.

Example User Equipment

Figure 5:
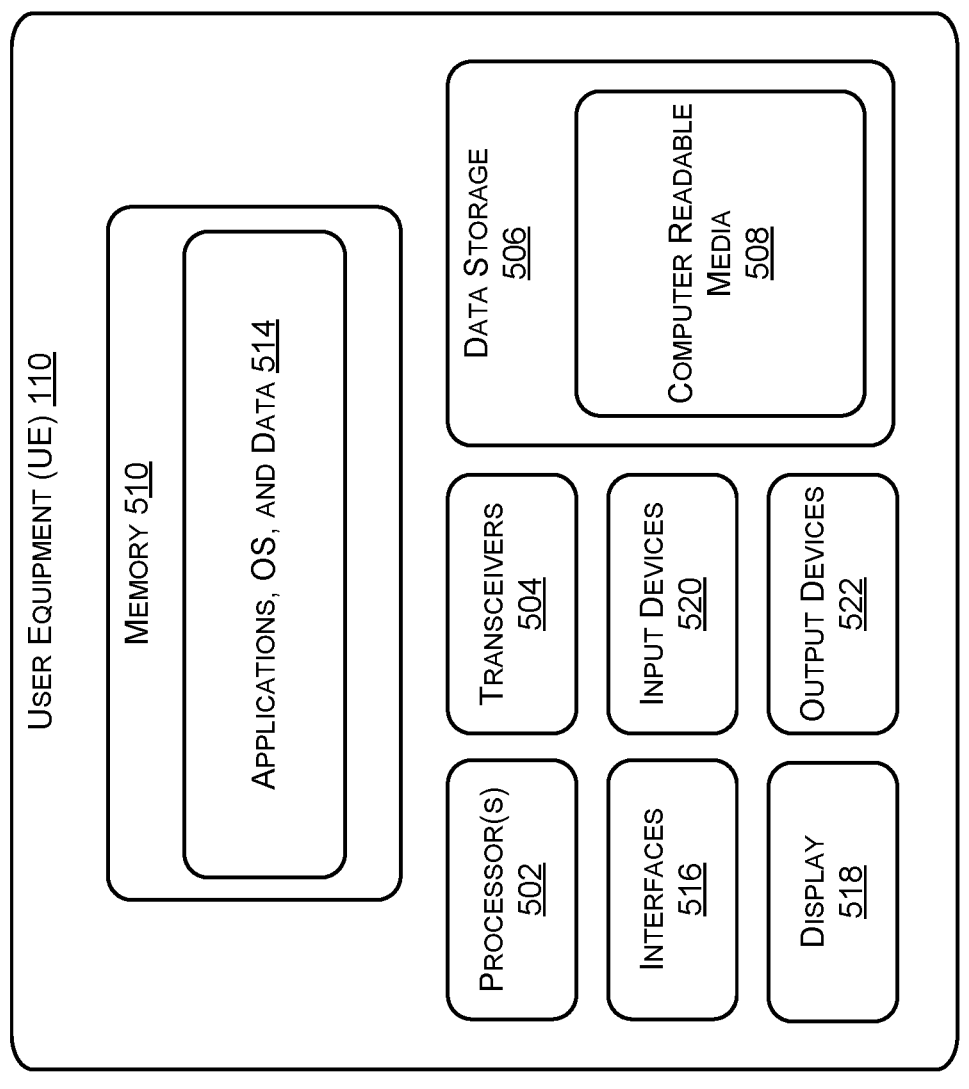
FIG. 5 is a schematic diagram of illustrative components in an example user device for providing short messaging services, in accordance with examples of the disclosure.

FIG. 5 is an example of a UE, such as UE 102, for use with the systems and methods disclosed herein, in accordance with some examples of the present disclosure. The UE 102 may include one or more processors 502, one or more transmit/receive antennas (e.g., transceivers or transceiver antennas) 504, and a data storage 506. The data storage 506 may include a computer readable media 508 in the form of memory and/or cache. This computer-readable media may include a non-transitory computer-readable media. The processor(s) 502 may be configured to execute instructions, which can be stored in the computer readable media 508 and/or in other computer readable media accessible to the processor(s) 502. In some configurations, the processor(s) 502 is a Central Processing Unit (CPU), a Graphics Processing Unit (GPU), or both CPU and GPU, or any other sort of processing unit. The transceiver antenna(s) 504 can exchange signals with a base station, such as the eNodeB 110.

The UE 102 may be configured with a memory 510. The memory 510 may be implemented within, or separate from, the data storage 506 and/or the computer readable media 508. The memory 510 may include any available physical media accessible by a computing device to implement the instructions stored thereon. For example, the memory 510 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information, and which may be accessed by the UE 102.

The memory 510 can store several modules, such as instructions, data stores, and so forth that are configured to execute on the processor(s) 502. In configurations, the memory 510 may also store one or more applications 514 configured to receive and/or provide voice, data and messages (e.g., SMS messages, Multi-Media Message Service (MMS) messages, Instant Messaging (IM) messages, Enhanced Message Service (EMS) messages, etc.) to and/or from another device or component (e.g., the eNodeB 110). The applications 514 may also include one or more operating systems and/or one or more third-party applications that provide additional functionality to the UE 102.

Although not all illustrated in FIG. 5, the UE 102 may also comprise various other components, e.g., a battery, a charging unit, one or more network interfaces 516, an audio interface, a display 518, a keypad or keyboard, and one or more input devices 520, and one or more output devices 522.

Example Computing Device

Figure 6:
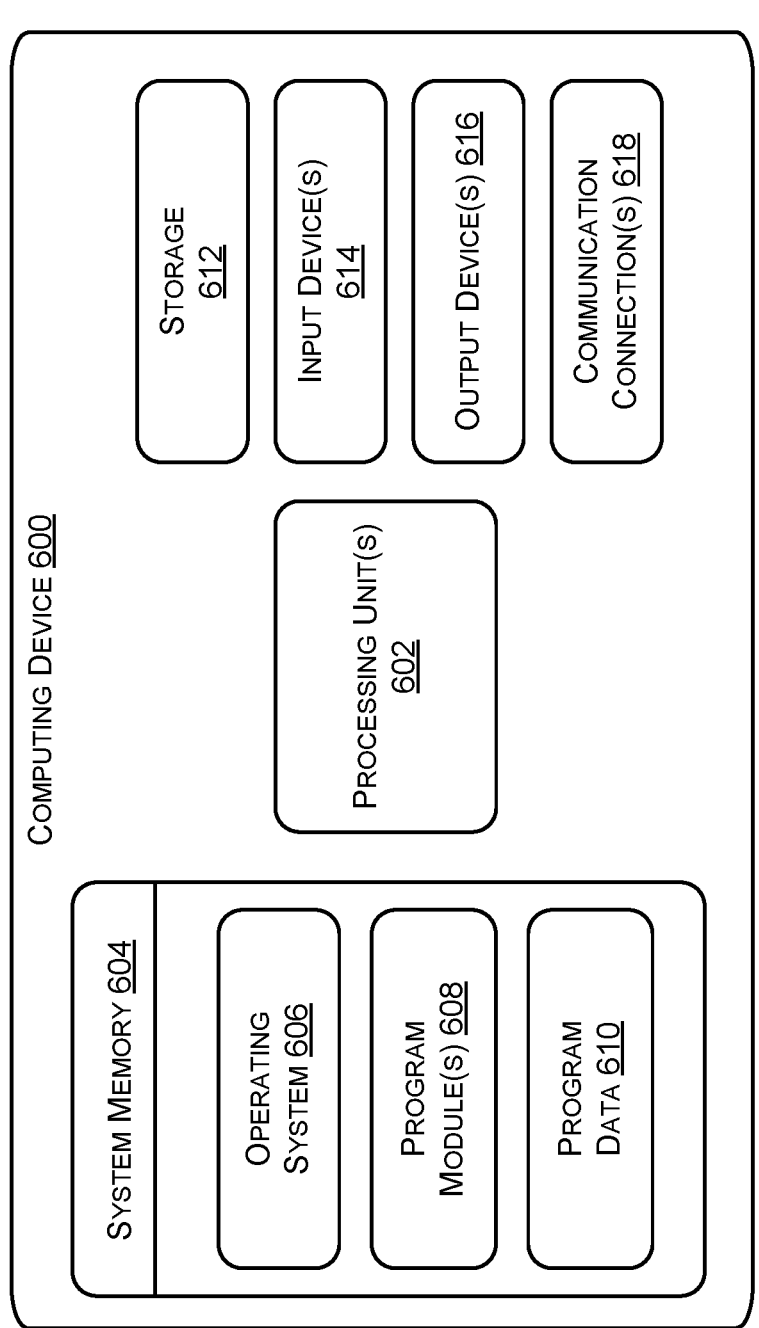
FIG. 6 is a schematic diagram of illustrative components in an example computing device that is configured for providing short messaging services, in accordance with examples of the disclosure.
Figure 6:

FIG. 6 is an example of a computing device 600 for use with the systems and methods disclosed herein, in accordance with some examples of the present disclosure. The computing device 600 can be used to implement various components of a core network, a base station, and/or any servers, routers, gateways, gateway elements, administrative components, etc. that can be used by a communication provider. One or more computing devices 600 can be used to implement the VPLMN 104, the VSS 128, the MCO 114, and the like. One or more computing devices 600 can also be used to implement base stations and other components.

In various embodiments, the computing device 600 can include one or more processing units 602 and system memory 604. Depending on the configuration and type of computing device, the system memory 604 can be volatile (such as RAM), non-volatile (such as ROM, flash memory, etc.) or some combination of the two. The system memory 604 can include an operating system 606, one or more program modules 608, and can include program data 610. The system memory 604 may be secure storage or at least a portion of the system memory 604 can include secure storage. The secure storage can prevent unauthorized access to data stored in the secure storage. For example, data stored in the secure storage can be encrypted or accessed via a security key and/or password. The program modules can include instructions to execute the VSS 128 or the MCO 114 of FIG. 1.

The computing device 600 can also include additional data storage devices (removable and/or non-removable)

such as, for example, magnetic disks, optical disks, or tape. Such additional storage is illustrated in FIG. 6 by storage 612.

Non-transitory computer storage media of the computing device 600 can include volatile and nonvolatile, removable and non-removable media implemented in any method or technology for storage of information, such as computer readable instructions, data structures, program modules, or other data. The system memory 604 and storage 612 are examples of computer readable storage media. Non-transitory computer readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by computing device 600. Any such non-transitory computer readable storage media can be part of the computing device 600.

In various embodiment, any or all of the system memory 604 and storage 612 can store programming instructions which, when executed, implement some or all of the functionality described above as being implemented by one or more systems configured in the wireless network environment 100.

The computing device 600 can also have one or more input devices 614 such as a keyboard, a mouse, a touch-sensitive display, voice input device, etc. The computing device 600 can also have one or more output devices 616 such as a display, speakers, a printer, etc. can also be included. The computing device 600 can also contain one or more communication connections 618 that allow the device to communicate with other computing devices using wired and/or wireless communications.

EXAMPLE CLAUSES

The following paragraphs describe various examples. Any of the examples in this section may be used with any other of the examples in this section and/or any of the other examples or embodiments described herein.

A: All methods, systems, and apparatuses, including all equivalents, disclosed herein.

Clause 1. A method, comprising: receiving a short messaging service (SMS) message from a short message service center (SMSC) of a home public land mobile network (HPLMN) intended for a user equipment (UE) registered with a visited public land mobile network (VPLMN), wherein the VPLMN is a first type of network; delivering the SMS message to a visitor subscriber server (VSS) of the VPLMN, wherein the VSS is configured to act as a proxy for a mobile switching center (MSC) of a second type of network; determining, by the VSS, if the UE supports SMS over internet protocol (IP) or SMS over service gateways (SGS); if the VSS determines that the UE supports SMS over IP, delivering the SMS message to an IP multimedia subsystem (IMS) of the VPLMN; or if the VSS determines that the UE does not support SMS over IP: delivering the SMS message using SMS over SGS from the VSS to a mobile call operator (MCO); delivering the SMS message from the MCO to a mobility management entity (MME) to which the UE is attached; and delivering the SMS message from the MME to the UE.

Clause 2. The method of clause 1 or 2, wherein determining, by the VSS, if the UE supports SMS over internet protocol (IP) or SMS over service gateways (SGS) comprises receiving an HLR profile comprising profile information of the UE from a home location register of the HPLMN during a registration process on the VPLMN of the UE, wherein the profile information comprises information to indicate that the UE supports SMS over IMS.

Clause 3. The method of any of clauses 1-2, wherein the registration process comprises: receiving, at the MME, an attach request from the UE; transmitting an SGS location update to the MCO, wherein the MCO is configured to provide services for a mobile switching server of the second type of network; transmitting a map update location from the MCO to the VSS; receiving the map update location from the MCO; and building a VSS profile for the UE if the VSS profile is not present or updating the VSS profile if the VSS profile was stored on the VSS.

Clause 4. The method of any of clauses 1-3, wherein the map update location comprises an international mobile subscriber identity (IMSI) of the UE.

Clause 5. The method of any of clauses 1-4, further comprising transmitting an updated map update location message to a home location register (HLR) of the HPLMN, wherein the updated map update location message comprises a VLR address of the VSS, and wherein the VLR address of the VSS is used by the SMSC of the HPLMN to direct the SMS message.

Clause 6. The method of any of clauses 1-5, further comprising receiving, at the VSS from the HLR, the HLR profile of the UE.

Clause 7. The method of any of clauses 1-6, wherein the HLR profile comprises a public number of the UE.

Clause 8. A non-transitory computer-readable media storing computer-executable instructions that, when executed by one or more processors, cause the one or more processors to perform operations comprising: receiving a short messaging service (SMS) message from a short message service center (SMSC) of a home public land mobile network (HPLMN) intended for a user equipment (UE) registered with a visited public land mobile network (VPLMN), wherein the VPLMN is a first type of network; delivering the SMS message to a visitor subscriber server (VSS) of the VPLMN, wherein the VSS is configured to act as a proxy for a mobile switching center (MSC) of a second type of network; determining, by the VSS, if the UE supports SMS over internet protocol (IP) or SMS over service gateways (SGS); if the VSS determines that the UE supports SMS over IP, delivering the SMS message to an IP multimedia subsystem (IMS) of the VPLMN; or if the VSS determines that the UE does not support SMS over IP: delivering the SMS message using SMS over SGS from the VSS to a mobile call operator (MCO); delivering the SMS message from the MCO to a mobility management entity (MME) to which the UE is attached; and delivering the SMS message from the MME to the UE.

Clause 9. The non-transitory computer-readable media of clause 8, wherein the computer-executable instructions for determining, by the VSS, if the UE supports SMS over internet protocol (IP) or SMS over service gateways (SGS) further comprising computer-executable instructions that, when executed by the one or more processors, cause the one or more processors to perform operations comprising receiving an HLR profile comprising profile information of the UE from a home location register of the HPLMN during a registration process on the VPLMN of the UE, wherein the profile information comprises information to indicate that the UE supports SMS over IMS.

Clause 10. The non-transitory computer-readable media of any of clauses 8-9, further comprising computer-executable instructions for the registration process that, when executed by the one or more processors, cause the one or more processors to perform operations comprising comprises: receiving, at the MME, an attach request from the UE; transmitting an SGS location update to the MCO, wherein the MCO is configured to provide services for a mobile switching server of the second type of network; transmitting a map update location from the MCO to the VSS; receiving the map update location from the MCO; and building a VSS profile for the UE if the VSS profile is not present or updating the VSS profile if the VSS profile was stored on the VSS.

Clause 11. The non-transitory computer-readable media of any of clauses 8-10, wherein the map update location comprises an international mobile subscriber identity (IMSI) of the UE.

Clause 12. The non-transitory computer-readable media of any of clauses 8-11, further comprising computer-executable instructions that, when executed by the one or more processors, cause the one or more processors to perform operations comprising transmitting an updated map update location message to a home location register (HLR) of the HPLMN, wherein the updated map update location message comprises a VLR address of the VSS, and wherein the VLR address of the VSS is used by the SMSC of the HPLMN to direct the SMS message.

Clause 13. The non-transitory computer-readable media of any of clauses 8-12, further comprising computer-executable instructions that, when executed by the one or more processors, cause the one or more processors to perform operations comprising receiving, at the VSS from the HLR, the HLR profile of the UE.

Clause 14. The non-transitory computer-readable media of any of clauses 8-13, wherein the HLR profile comprises a public number of the UE.

Clause 15. A mobile telecommunications network, comprising: a visitor subscriber server (VSS) acting as a proxy for a mobile switching center (MSC) used in a 2G/3G network, wherein the VSS is configured to: update or build a profile of a user equipment (UE) that is roaming on the mobile telecommunications network, wherein the mobile telecommunications network is acting as a visited public land mobile network (VPLMN) for the UE; transmit a visitor location register address of the VSS to a short message service center (SMSC) of a home public land mobile network (HPLMN) of the UE, wherein the SMSC is configured to receive an SMS message for the UE; using an HLR profile provided by a home location register (HLR) of the HPLMN to determine if the SMS message is to be delivered to the UE using SMS over internet protocol (IP) or SMS over service gateways (SGS) and to provide registration verification services; maintain a database comprising information about subscribers roaming within the mobile telecommunications network; and deliver the SMS message to an IP multimedia subsystem (IMS) if the UE supports SMS over IP or to a mobile call operator (MCO) if the UE does not support SMS over IP; the MCO configured to: receive the SMS message from the VSS if SMS over SGS is used by the VSS to deliver the SMS message; and deliver the SMS message to a mobility management entity (MME) to which the UE is attached.

Clause 16. The mobile telecommunications network of clause 15, further comprising a mobility management entity (MME), wherein the UE is registered by: receiving, at the MME, an attach request from the UE; transmitting an SGS location update to the MCO; transmitting a map update location from the MCO to the VSS; receiving the map update location from the MCO; and building a VSS profile for the UE if the VSS profile is not present or updating the VSS profile if the VSS profile was stored on the VSS.

Clause 17. The mobile telecommunications network of any of clauses 15-16, wherein the map update location comprises an international mobile subscriber identity (IMSI) of the UE.

Clause 18. The mobile telecommunications network of any of clauses 15-17, wherein the VSS is further configured to transmit an updated map update location message to the HLR of the HPLMN, wherein the updated map update location message comprises a VLR address of the VSS to be used by the SMSC of the HPLMN to direct the SMS message.

Clause 19. The mobile telecommunications network of any of clauses 15-18, wherein the VSS is further configured to receive from the HLR the HLR profile of the UE.

Clause 20. The mobile telecommunications network of any of clauses 15-19, wherein the HLR profile comprises a public number of the UE.

While the example clauses described above are described with respect to one particular implementation, it should be understood that, in the context of this document, the content of the example clauses can also be implemented via a method, device, system, computer-readable medium, and/or another implementation. Additionally, any of the examples A-S can be implemented alone or in combination with any other one or more of the examples A-S.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method, comprising:

during a registration process on a visited public land mobile network (VPLMN) of a user equipment (UE), receiving at the VPLMN a home location register (HLR) profile comprising profile information of the UE from the HLR of a home public land mobile network (HPLMN), wherein the VPLMN is a first type of network and the registration process includes:

receiving, at a visitor subscriber server (VSS) of the VPLMN, a map update location from associated with the UE, and building a VSS profile for the UE if the VSS profile is not present or updating the VSS profile if the VSS profile was stored on the VSS;

receiving, at the VSS, a short messaging service (SMS) message from the HPLMN intended for a user equipment (UE) when the UE is registered with the VPLMN, wherein the VSS is configured to act as a proxy for a mobile switching center (MSC) of a second type of network;

determining, by the VSS, if the UE supports SMS over internet protocol (IP) or SMS over service gateways (SGS);

if the VSS determines that the UE supports SMS over IP, delivering the SMS message to an IP multimedia subsystem (IMS) of the VPLMN; or if the VSS determines that the UE does not support SMS over IP, delivering the SMS message to the UE using SMS over SGS, wherein the delivering comprises delivering the SMS message from the VSS to a mobile call operator (MCO), which delivers the SMS message to a mobility management entity (MME) to which the UE is attached, which in turn delivers the message to the UE.

2. The method of claim 1, wherein determining, by the VSS, if the UE supports SMS over internet protocol (IP) or SMS over service gateways (SGS) is based at least in part on the profile information, and the profile information comprises information to indicate that the UE supports SMS over IMS.

3. The method of claim 1, wherein the registration process further comprises:

receiving, at the MME, an attach request from the UE;

transmitting an SGS location update to the MCO, wherein the MCO is configured to provide services for a mobile switching server of the second type of network; and

transmitting the map update location from the MCO to the VSS.

4. The method of claim 1, wherein the map update location comprises an international mobile subscriber identity (IMSI) of the UE.

5. The method of claim 1, further comprising transmitting an updated map update location message to the HLR of the HPLMN, wherein the updated map update location message comprises a visitor location register (VLR) address of the VSS, and wherein the VLR address of the VSS is used by a short message service center (SMSC) of the HPLMN to direct the SMS message.

6. The method of claim 1, wherein the HLR profile comprises a public number of the UE.

7. A non-transitory computer-readable media storing computer-executable instructions that, when executed by one or more processors, cause the one or more processors to perform operations comprising:

during a registration process on a visited public land mobile network (VPLMN) of a user equipment (UE), receiving at the VPLMN a home location register (HLR) profile comprising profile information of the UE from the HLR of a home public land mobile network (HPLMN) wherein the VPLMN is a first type of network and the registration process includes:

receiving, at a visitor subscriber server (VSS) of the VPLMN, a map update location from associated with the UE, and building a VSS profile for the UE if the VSS profile is not present or updating the VSS profile if the VSS profile was stored on the VSS;

receiving, at the VSS, a short messaging service (SMS) message from the HPLMN intended for a user equipment (UE) when the UE is registered with the VPLMN, wherein the VSS is configured to act as a proxy for a mobile switching center (MSC) of a second type of network;

determining, by the VSS, if the UE supports SMS over internet protocol (IP) or SMS over service gateways (SGS);

if the VSS determines that the UE supports SMS over IP, delivering the SMS message to an IP multimedia subsystem (IMS) of the VPLMN; or if the VSS determines that the UE does not support SMS over IP, delivering the SMS message to the UE using SMS over SGS, wherein the delivering comprises delivering the SMS message from the VSS to a mobile call operator (MCO), which delivers the SMS message to a mobility management entity (MME) to which the UE is attached, which in turn delivers the message to the UE.

8. The non-transitory computer-readable media of claim 7, wherein the determining, by the VSS, if the UE supports SMS over internet protocol (IP) or SMS over service gateways (SGS) is based at least in part on the profile information, and the profile information comprises information to indicate that the UE supports SMS over IMS.

9. The non-transitory computer-readable media of claim 7, wherein the registration process further comprises:

receiving, at the MME, an attach request from the UE;

transmitting an SGS location update to the MCO, wherein the MCO is configured to provide services for a mobile switching server of the second type of network; and transmitting the map update location from the MCO to the VSS.

10. The non-transitory computer-readable media of claim 7, wherein the map update location comprises an international mobile subscriber identity (IMSI) of the UE.

11. The non-transitory computer-readable media of claim 7, further comprising computer-executable instructions that, when executed by the one or more processors, cause the one or more processors to perform operations comprising transmitting an updated map update location message to the HLR, wherein the updated map update location message comprises a visitor location register (VLR) address of the VSS, and wherein the VLR address of the VSS is used by a short message service center (SMSC) of the HPLMN to direct the SMS message.

12. The non-transitory computer-readable media of claim 7, wherein the HLR profile comprises a public number of the UE.

13. A mobile telecommunications network, comprising:

a visitor subscriber server (VSS) acting as a proxy for a mobile switching center (MSC) used in a 2G/3G network, wherein the VSS is configured to:

update or build a profile of a user equipment (UE) that is roaming on the mobile telecommunications network, wherein the mobile telecommunications network is acting as a visited public land mobile network (VPLMN) for the UE, wherein the updating or building is based at least in part on a map location update received from a mobile call operator (MCO) for the UE;

transmit a visitor location register address of the VSS to a short message service center (SMSC) of a home public land mobile network (HPLMN) of the UE, wherein the SMSC is configured to receive an SMS message for the UE;

using a home location register (HLR) profile provided by an HLR of the HPLMN to determine if the SMS message is to be delivered to the UE using SMS over internet protocol (IP) or SMS over service gateways (SGS) and to provide registration verification services;

maintain a database comprising information about subscribers roaming within the mobile telecommunications network; and deliver the SMS message to an IP multimedia subsystem (IMS) if the UE supports SMS over IP or to a mobile call operator (MCO) if the UE does not support SMS over IP;

the MCO configured to:

receive the SMS message from the VSS if SMS over SGS is used by the VSS to deliver the SMS message; and deliver the SMS message to a mobility management entity (MME) to which the UE is attached.

14. The mobile telecommunications network of claim 13, further comprising a mobility management entity (MME), wherein the UE is registered by:

receiving, at the MME, an attach request from the UE;

transmitting an SGS location update to the MCO;

transmitting the map update location from the MCO to the VSS; and receiving the map update location from the MCO.

15. The mobile telecommunications network of claim 13, wherein the map update location comprises an international mobile subscriber identity (IMSI) of the UE.

16. The mobile telecommunications network of claim 13, wherein the VSS is further configured to transmit an updated map update location message to the HLR of the HPLMN, wherein the updated map update location message comprises a visitor location register (VLR) address of the VSS to be used by the SMSC of the HPLMN to direct the SMS message.

17. The mobile telecommunications network of claim 13, wherein the HLR profile comprises a public number of the UE.

* * * * *